United States Patent
Jankowski et al.

(10) Patent No.: US 8,941,467 B2
(45) Date of Patent: Jan. 27, 2015

(54) HIGH VALUE DISPLAY CASE SYSTEM

(75) Inventors: Peter A. Jankowski, Rancho Santa Fe, CA (US); Daniel T. Petkevich, Solana Beach, CA (US); Bill Jacobs, Bonsall, CA (US); Jumbi Edulbehram, Cambridge, MA (US)

(73) Assignee: Next Level Security Systems, Inc., Carlsbad, CA (US)

( * ) Notice: Subject to any disclaimer, the term of this patent is extended or adjusted under 35 U.S.C. 154(b) by 445 days.

(21) Appl. No.: 13/154,256

(22) Filed: Jun. 6, 2011

(65) Prior Publication Data
US 2012/0310716 A1    Dec. 6, 2012

(51) Int. Cl.
*G05B 19/00*    (2006.01)

(52) U.S. Cl.
USPC ............... 340/5.91; 340/5.61; 340/539.11; 235/382; 235/385; 705/14.4; 705/28

(58) Field of Classification Search
USPC ............. 700/231–244; 340/5.91, 5.61, 5.7, 340/539.1, 539.11; 235/381, 382, 383, 385; 705/14.27, 14.4, 14.41, 14.45, 28
See application file for complete search history.

(56) References Cited

U.S. PATENT DOCUMENTS

| | | | | |
|---|---|---|---|---|
| 6,748,296 B2 * | 6/2004 | Banerjee et al. | .............. | 700/241 |
| 8,452,868 B2 * | 5/2013 | Shafer et al. | .................. | 709/224 |
| 2005/0165612 A1 | 7/2005 | Van Rysselberghe | | |
| 2007/0288324 A1 | 12/2007 | Skelton et al. | | |
| 2008/0191008 A1 | 8/2008 | Manfredi et al. | | |
| 2009/0153646 A1 | 6/2009 | Bourguignon et al. | | |
| 2010/0138037 A1 * | 6/2010 | Adelberg et al. | .............. | 700/241 |
| 2010/0228390 A1 * | 9/2010 | Hudis | ........................... | 700/241 |
| 2011/0057774 A1 * | 3/2011 | Van Rysselberghe | ....... | 340/5.73 |
| 2012/0016518 A1 * | 1/2012 | Saario et al. | .................. | 700/232 |

OTHER PUBLICATIONS

"Lands' End launches live video chat", [online]. Retrieved from the Internet: <URL: http://www.internetretailer.com/2010/10/06/lands-end-launches-live-video-chat>, (Oct. 6, 2010), 2 pgs.

"Specialty pharmacy implements video", [online]. Retrieved from the Internet: <URL: http://www.internetretailer.com/2011/01/21/specialty-pharmacy-implements-video-chat>, (Jan. 21, 2011), 3 pgs.

* cited by examiner

*Primary Examiner* — Hung T. Nguyen
(74) *Attorney, Agent, or Firm* — Schwegman Lundberg & Woessner, P.A.

(57) ABSTRACT

A display case system has a display case, a gateway, and a communication device. The display case houses a product. The gateway is coupled to the display case and communicates with a client device associated with the product in the display case. A communication device is coupled to the gateway and enables a communication session between the communication device and the client device associated with the product. The client device remotely locks and unlocks the display case to allow access to the product based on the communication session.

18 Claims, 14 Drawing Sheets

HIGH VALUE DISPLAY CASE SYSTEM

TECHNICAL FIELD

This application relates generally to the field of computer technology, and in a specific example embodiment, a display case system for high value items.

BACKGROUND

To combat theft in retail stores, many retailers keep high value merchandise in locked display cases or off the shopping floor with only a tag and a description of the product. For products in locked display cases, the only way a customer can retrieve the product is by finding the right store personnel with the right key to unlock the display case. For tagged products, tags need to be brought to certain sections of the store to be picked up after the purchase is made.

Such processes cause a lot of frustration for many consumers. Customers may end up going elsewhere for their products, which results in lost sales to the retail store. Such locked display cases, originally designed to deter shoplifters, are also deterring sales.

BRIEF DESCRIPTION OF THE DRAWINGS

The present invention is illustrated by way of example, and not by way of limitation, in the figures of the accompanying drawings in which.

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a display case system is described. The display case system includes a display case, a gateway, and a communication device. The display case houses a product. The gateway is coupled to the display case and communicates with a client device associated with the product in the display case. A communication device is coupled to the gateway and enables a communication session between the communication device and the client device associated with the product. The client device remotely locks and unlocks the display case to allow access to the product based on the communication session.

Figure 1A:
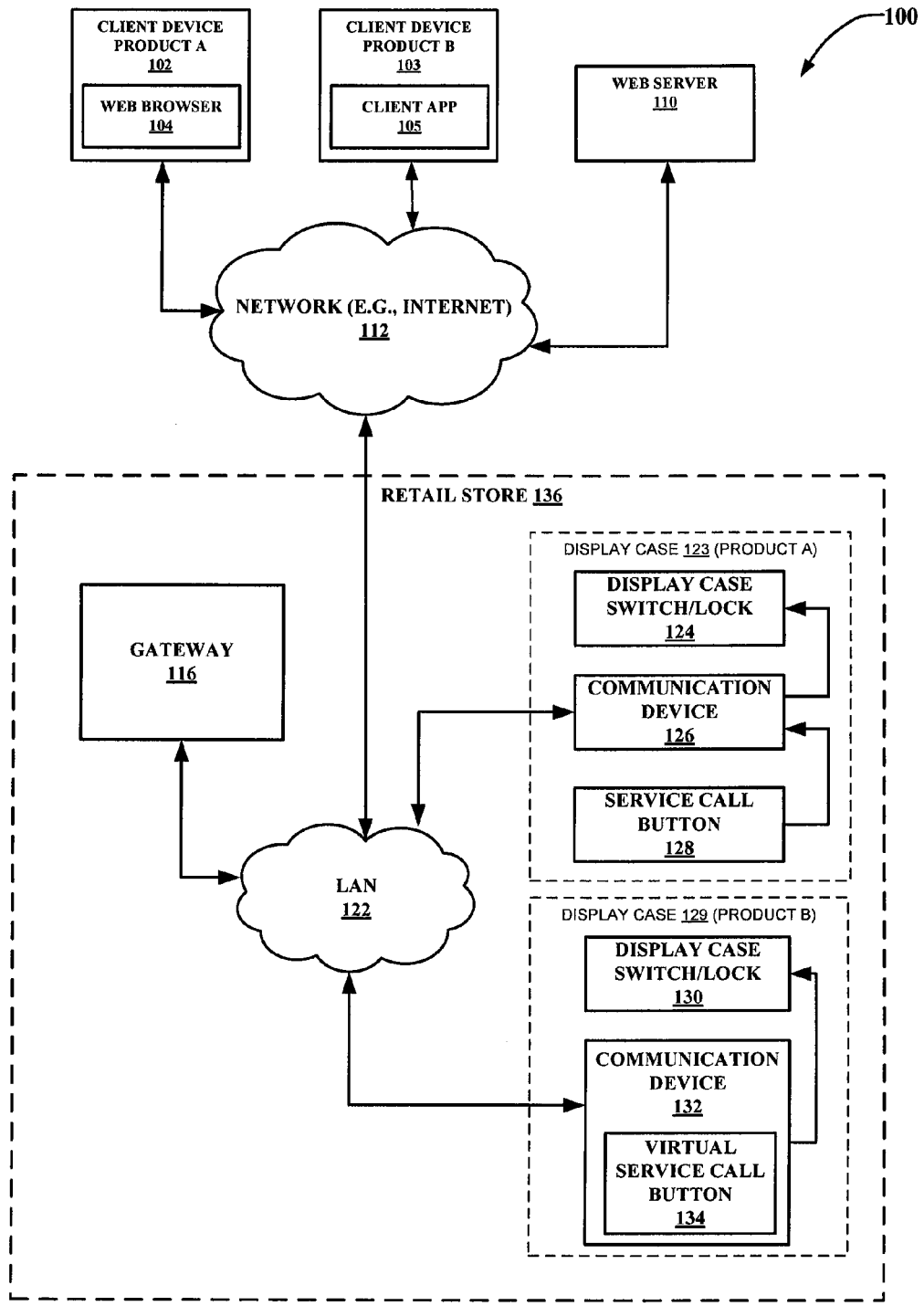
FIG. 1A is a network diagram depicting a high value display case system, according to one embodiment.

FIG. 1A is a network diagram depicting a network system 100, according to one embodiment, for exchanging data over a computer network 112 (e.g. TCP/IP network). For example, the network system 100 comprises client devices 102, 103, web server 110, and gateway 116 at a site (e.g., retail store) 136.

For purposes of the present embodiment, the terms "sites" and "premises" refer to any location to be monitored, whether residential, commercial, public, or secured. Further, the term "a" is generally used in the present disclosure to mean one or more. Still further, the terms "coupled" and "operatively coupled" mean connected in such a way that data may be exchanged. It is understood that "coupled" and "operatively coupled" do not require a direct connection, a wired connection, or even a permanent connection. It is sufficient for purposes of the present embodiment that the connection(s) be established for the sole purpose of exchanging information.

The client device 102 may be associated with a product, such as product A. The client device 103 may be associated with another product, such as product B. Those of ordinary skill in the art will recognize that each client device may be associated with one or more products from a same category, brand, type or any other contextual relationship. For example, client device 102 may be associated with all digital cameras on display at the retail store 136.

The client devices 102, 103 are connected to the computer network 112. The client devices 102, 103 can include, but are not limited to, a desktop computer, a laptop computer, a mobile computing device, a mobile smart phone device, and so forth. A network interface means is provided to enable the client devices 102, 103 to send and receive data to and from the computer network 112. The client device 102 includes a web browser 104 that may be in communication with the web server 110 via the computer network 112. The client device 103 includes a client application 105 that may be in communication with the web server 110 via the computer network 112. The web browser 104 and the client application 105 may be used to display some or all of the information and monitoring data provided by gateway 116.

The computer network 112 includes a local area network (LAN) where Gigabit Ethernet switches are used to switch data. In another example, the computer network 112 includes a wide area network (WAN), such as the Internet. In general, computer network 112 may be a public network or private network, and a single network or a combination of several networks. In most embodiments, computer network 112 may be, but is not required to be, an IP-based network. In some embodiments it may be desirable for all or a portion of network 112 to include publicly available networks, such as the Internet, to avoid the need for installing, purchasing, or leasing additional infrastructure.

The web server 110 may also connect to the computer network 112 both to receive and transmit data. The web server 110 may also be referred to as a web-based host. The web server 110 is connected to the computer network 112 by means of a network interface. The network interface can take the form of a network interface card (not shown) installed within the web server 110 to enable data to be sent and received to and from the computer network 112 by the web server 110.

In one embodiment, the web server 110 identifies one or more gateway(s) for the client devices 102, 103 to communicate with, so as to monitor and/or control the security devices connected to the corresponding gateway(s).

In another embodiment, the web server 110 may provide server-side functionality, via the computer network 112, to the client devices 102, 103. The client devices 102, 103 may enable users who utilize the network system 100 and, more specifically, the web server 110, to view monitoring data (e.g., audio/video feed) from security devices and control security devices (e.g., locks) connected to gateway 116 over the computer network 112. These transactions may include transmitting, receiving (communicating) and processing data to, from, and regarding monitoring data and users of the network system 100. The data may include, but are not limited to audio, video, picture, metadata, camera configuration data, client device configuration data, and network data monitoring data. The web server 110 can provide other functions including storing monitoring data to an internal or external disk storage device (not shown), and playing back recorded monitoring data.

In one embodiment, the web server 110 may include a directory of gateways and the location of corresponding connected security devices. The web server 110 is described in more detail below with respect to FIGS. 2A, 2B, and 2C. As such, the web server 110 may correlate the gateway 116 to retail store 136. In one embodiment, the correlation may be generated pursuant to pre-defined settings or configured based on user profile, organization topology, hierarchy, bandwidth and other factors. For example, a user at client device 102 may be a customer service representative associated with retail stores located on the West coast. As such, based on the user profile and the organization topology, the user can access the gateway 116 to obtain monitoring data from retail store 136 and other gateways in retail stores located on the West coast. In other words, the user does not have to communicate directly with several gateways to monitor all security devices attached to the corresponding gateways. In another embodiment, the web server 110 may correlate gateway 116 with other gateways. In yet another embodiment, the other gateways may be correlated with other gateways. For example, information from other gateways correlated with the gateway 116 may be communicated with the user at the client devices 102 or 103.

Generally, the gateway 116 includes a processor-based device that operates to monitor conditions at a target site or premise, analyze monitoring data, detect alarm conditions at the target site or premise, capture information relating to such alarm conditions, and send such monitoring information to client devices 102, 103 and/or the web server 110.

Security devices are connected to the gateway 116 via LAN 122. Monitoring devices include, for example, sensors. The gateways are not limited to connecting to any specific type or model of sensors or monitoring devices. Any sensor may be used, depending on the desired type and level of protection. Examples include, without limitation, microphones, cameras, magnetic contact switches, audio sensors, infrared sensors, motion detectors, fire alarms, and carbon monoxide sensors.

For illustration purposes, a display case 123 for product A at retail store 136 includes a display case switch/lock 124, a communication device 126, and a service call button 128. The display case switch/lock 124 is connected to and controlled by the communication device 126 (for example, via a contact closure component of the communication device 126 that controls a relay connected to the display case switch/lock 124). The communication device 126 includes for example a microphone, a speaker, a video camera, and a display device among others. The service call button 128 may include a physical switch or a button connected to the communication device 126. In one embodiment, the service call button 128 is configured to communicate with the gateway 116 to alert the system of a customer's request to access the display case.

Another display case 129 for product B at retail store 136 includes a display case switch/lock 130, a communication device 132, and a virtual service call button 134 as part of the communication device 132. For example, the communication device 132 may include a touchscreen, a microphone, and a video camera. The touchscreen may act as a virtual service call button 134 when the customer touches the screen to activate the service call.

The display case switches/locks 124, 130 each include, for example, a locking mechanism such as a lock or a switch. The locking mechanism is connected and triggered by a relay. Those of ordinary skill in the art will recognize that other types of locking mechanisms may be used to secure the display case.

Figure 1B:
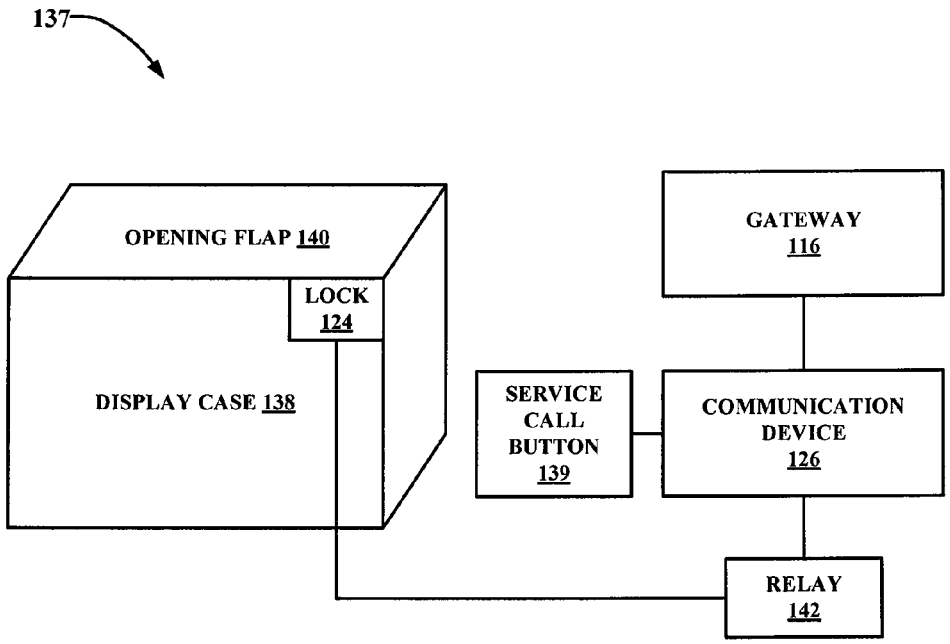
FIG. 1B is a block diagram illustrating a high value display case according to one embodiment.

FIG. 1B is a block diagram depicting a high value display case system 137 according to one embodiment. A display case 138 includes an enclosure made of, for example, a transparent material (e.g., glass). The display case 138 includes an opening flap 140 that allows the customer to reach inside the display case 138 to grab one or more products displayed therein. The opening flap 140 may be coupled by a hinge along one of its sides to the display case 138.

The switch/lock 124 is positioned between the display case 138 and the opening flap 140 to allow the opening flap 140 to be locked or unlocked. In one embodiment, the switch/lock 124 is connected to a relay 142 that is triggered by the communication device 126. In one embodiment, the service call button 139 included a physical button connected to the communication device 126. In another embodiment, the service call button 139 may be part of the communication device 126 and implemented as a virtual button on a touchscreen of the communication device 126. The communication device 126 is connected to the gateway 116.

Figure 1C:
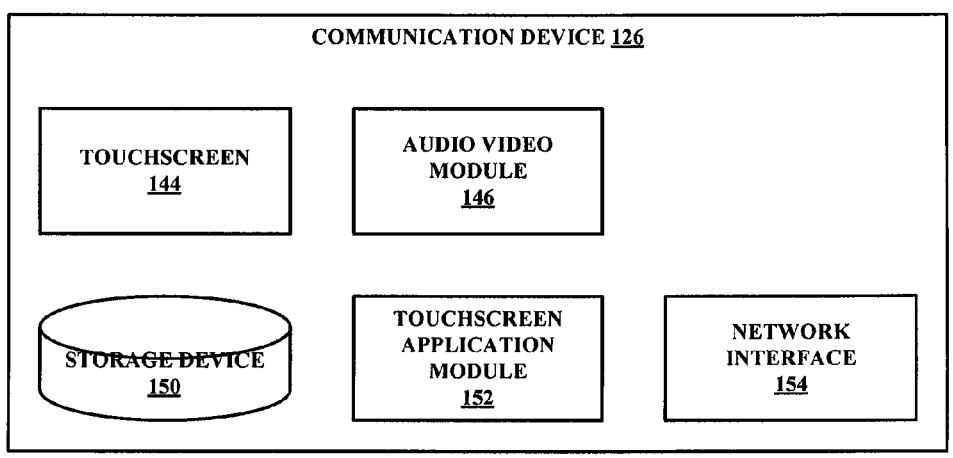
FIG. 1C is a block diagram illustrating a communication device in use with the high value display case according to one embodiment.

FIG. 1C is a block diagram illustrating the communication device 126 in use with the high value display case according to one embodiment. The communication device 126 includes for example, a touchscreen 144, an audio video module 146, a storage device 150, a touchscreen application module 152, and a network interface 154.

The audio video module 146 is configured to provide audio and video capability to the touchscreen 144. In one embodiment, the audio video module 146 includes a video camera, speakers, and a microphone.

The touchscreen application module 152 is configured to provide applications to the touchscreen 144. For example, the touchscreen application module 152 may include software components to generate a virtual service call button on the touchscreen 144. Furthermore, the touchscreen application module 152 includes software components to enable operation of the video camera, the speakers and the microphone so as to establish a (audio/video) communication session.

In another embodiment, the touchscreen application module 152 may include software components to generate ads, surveys, graphical user interface on the touchscreen 144. The software components may be pushed from the gateway 116. As such, the touchscreen can be updated with the latest promotion, ads, or graphical user/customer interface. For example, the touchscreen 144 may display an ad or a promotion for the product in the display case 138. In another example, the touchscreen 144 may display a customer satisfaction survey for the customer to rate the communication session. As an incentive, the customer may receive a credit or discount on the product or a future purchase for filling out the survey on the touchscreen. In another example, the touchscreen may allow the customer to rate the customer service and provided his email address for future promotions.

The storage device 150 may be configured to store communication sessions and applications or software components for the touchscreen application module 152. The storage device 150 may be located internally or externally (e.g. external hard drive) to the communication device 126. The network interface 154 enables the communication device 126 to communicate with the gateway 116. In one embodiment, the communication sessions may also be uploaded and stored on the gateway 116 or a remote client device.

Figure 2A:
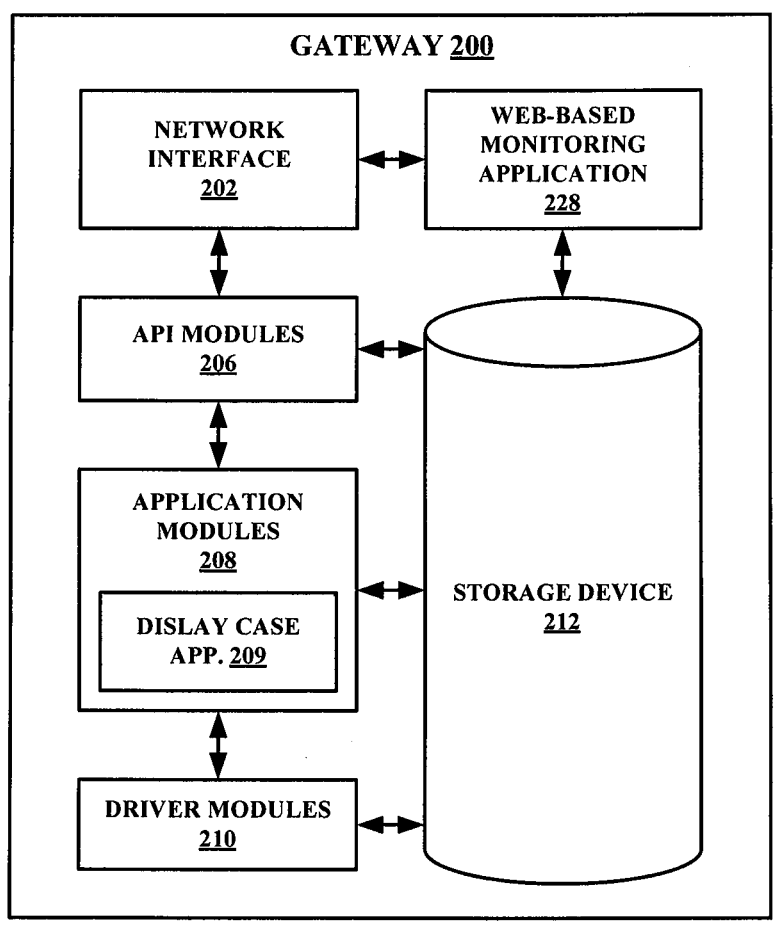
FIG. 2A is a block diagram illustrating an example embodiment of a gateway.

FIG. 2A is a block diagram illustrating an example embodiment of a gateway 200. The gateway 200 includes a network interface 202, API modules 206, application modules 208, driver modules 210, a web-based monitoring application 228, and a storage device 212. The network interface 202 enables the gateway 200 to communicate with the computer network 112. The API modules 206 enable the gateway 200 to interface the gateway with the client devices 102, 106, the web server 110, and other third party devices (not shown). The application modules 208 enable the gateway 200 to monitor or control the corresponding monitoring or controlling devices connected to the gateway 200. In addition, the application modules 208 enable the gateway 200 to provide add-on expandable services, as discussed further below. In one embodiment, the application modules 208 include a display case application 209 that is further discussed below in FIG. 2D. The driver modules 210 include device drivers to enable interaction of the application modules 208 with the hardware of the corresponding monitoring or controlling devices. The web-based monitoring application 228 enables the gateway 200 to communicate monitoring and controlling data to the client device. The web-based monitoring application 228 is discussed in more detail with respect to FIG. 2C. The storage device 212 may be used to store monitoring data from the monitoring devices connected to the gateway 200, APIs from API modules 206, software applications from application modules 208, device drivers from driver modules 210, and a configuration of the gateway 200. For example, the configuration of the gateway 200 may include a topology or hierarchy at a user level, organization level, or partner level. The configuration of the gateway 200 may specifically include an enterprise configuration of the gateway 200 (based on the topology/hierarchy previously mentioned). In one embodiment, the configuration of the gateway 200 may be replicated to other gateways that are correlated by the web server based on the topology/hierarchy. For example, some gateways can have access control to a limited number of security devices. In another embodiment, each gateway may be custom configured. In another embodiment, the gateway is configured to aggregate data from multiple gateways (which may be correlated by the web server 110 based on the topology) and present the aggregated data to the client device.

Figure 2B:
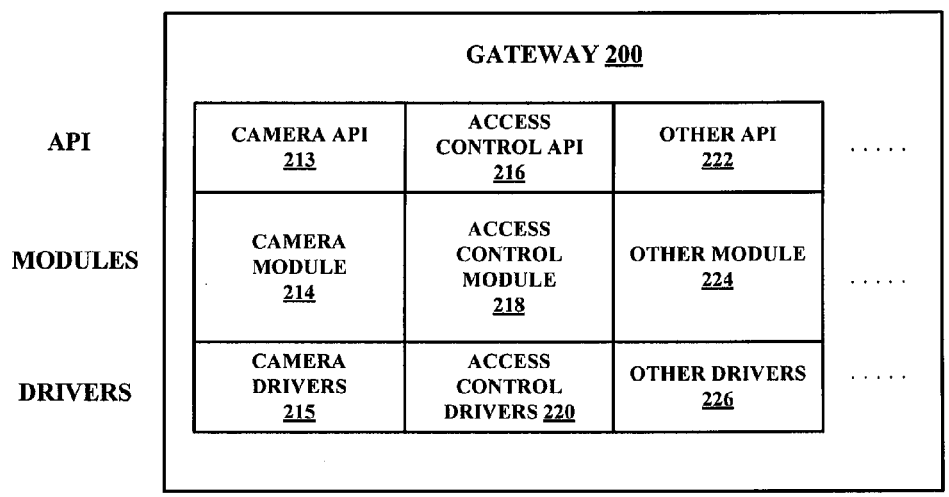
FIG. 2B is a block diagram illustrating another example embodiment of a gateway.

FIG. 2B is a block diagram illustrating another example embodiment of the gateway 200. For example, the gateway 200 includes a camera API 213, a camera application module 214, and camera drivers 215. The camera API 213 provides an interface to the web browser 104 or the client application 108 of the client device to receive and send data from a camera connected to the gateway 200. The camera application module 214 enables the client device to receive data (e.g., audio and video) from the camera via the camera API 213. In another embodiment, the camera application module 214 enables the client device to send data to the camera (e.g., focus, tilt, pan, zoom) to the camera via the camera API 213. The camera drivers 215 include one or more drivers for different brands or manufacturers of cameras.

In another example, the gateway 200 also includes an access control API 216, an access control application module 218, and access control drivers 220. The access control API 216 provides an interface to the web browser 104 or the client application 108 of the client device to receive and send data from an access control device (e.g., a door access at a monitored site) connected to the gateway 200. The access control application module 218 enables the client device to receive data (e.g. time and ID log of the door access at the monitored site) from the access control device via the access control API 216. In another embodiment, the access control module 218 enables the client device to send data to the access control device (e.g., open, close, lock door) to the access control device via the access control API 216. The access control drivers 220 include one or more drivers for different brands or manufacturers of access control devices.

One advantage of one of the embodiments of the gateway 200 is the ability to easily connect additional devices or third party devices. This is illustrated with respect to other API 222, other module 224, and other drivers 226. As such, the gateway 200 is not limited to any particular manufacturer of devices or brand of devices. The gateway 200 allows for easy expansion and plug-in features using additional APIs, corresponding modules, and corresponding device drivers.

Figure 2C:
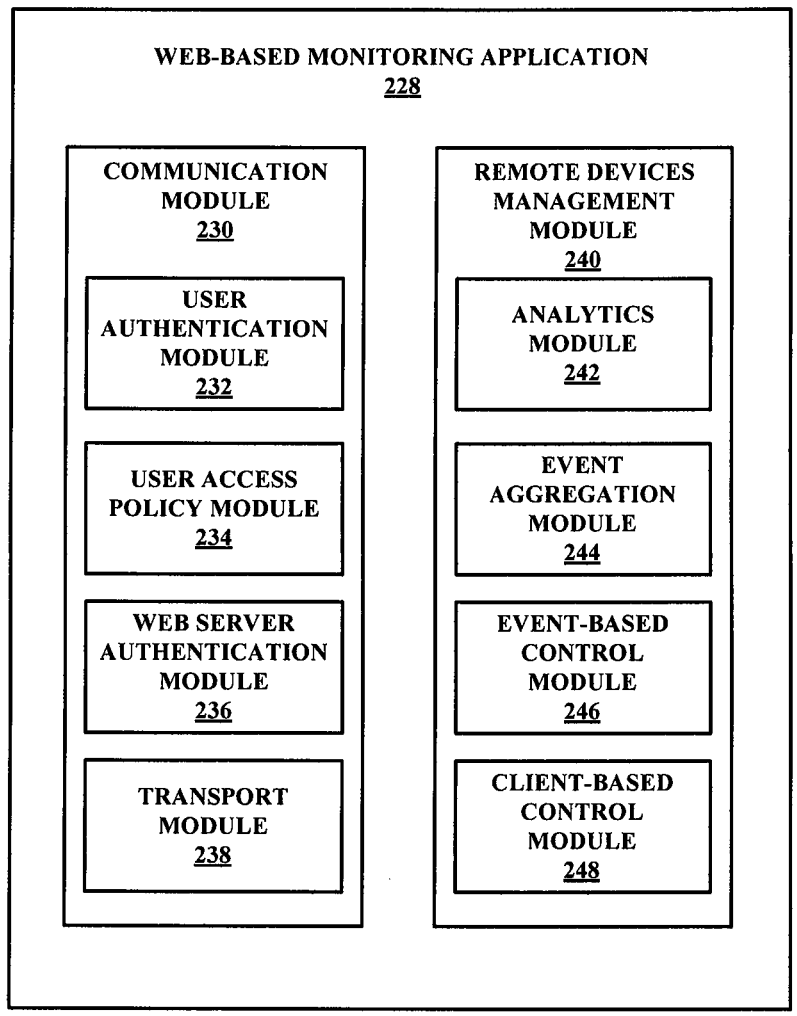
FIG. 2C is a block diagram illustrating an example embodiment of a web-based monitoring application of a gateway.

FIG. 2C is a block diagram illustrating an example embodiment of a web-based monitoring application 228 of the gateway 200. The web-based monitoring application 228 enables client devices to remotely monitor and control monitoring and controlling devices connected to the gateway 200 via the web browser 104 or the client application 108 at the client devices 102, 103.

In one embodiment, the web-based monitoring application 228 includes a communication module 230 and a remote devices management module 240. The communication module 230 enables communication between the gateway 200 and the client devices 102, 103. The remote devices management module 240 enables the client devices 102, 103 to monitor or control the monitoring or controlling devices connected to the gateway 200.

For example, the communication module 230 includes a user authentication module 232, a user access policy module 234, a web server authentication module 236, and a transport module 238.

The user authentication module 232 authenticates a user at the client device based on a user profile of the user. An example of user authentication may include verifying the username and password provided by the client device with a predefined user profile. The predefined user profile may be stored in the storage device 212 or at the web server 110.

The user access policy module 234 limits or grants the user at the client device access to the monitoring and/or controlling devices connected to the gateway. For example, a user with limited privileges may have access to the monitoring data of a particular site (e.g., first floor only) or a specific monitoring device (e.g. HVAC only). On the other hand, a user with executive privilege may be able to view monitoring data and control security devices from more sites.

The web server authentication module 236 authenticates a communication between the gateway 200 and the web server 110. For example, the gateway 200 transmits a unique token to the web server 110 for authentication prior to establishing the secured communication. Those of ordinary skill in the art will recognize that other means of authentication between the gateway 200 and the web server 110 may be used.

The transport module 238 enables peer-to-peer communication between gateways. As such, a client device communicating with one gateway at a first location is also able to communicate with another gateway at a second location.

For example, the remote devices management module 240 of the web-based monitoring application 228 includes an analytics module 242, an event aggregation module 244, an event-based control module 246, and a client-based control module 248.

The analytics module 242 analyzes audio/video and other detected changes from the monitoring devices and generates events based on the analysis. For example, the analytics module 242 is capable of determining how many people have entered or left an activity zone (e.g., a room, a hallway) in a video feed, the direction of the movement of individuals in a video feed, the temperature of individuals in a video feed, facial recognition of individuals in a video feed, and so forth. Events are generated based on the analysis and predefined user-configured settings. A user at the client device is able to configure the conditions for generating an event from the web browser 104 of the client device 102 or the client application 108 of the client device 103.

The event aggregation module 244 aggregates events generated from the analytics module 242. For example, events generated based on the analysis and predefined/user-configured settings are aggregated in a log stored in a storage device attached to the gateway 200, in a storage device attached to another gateway, in a storage device attached to the web server 110, or in a storage device connected to the client device.

The event-based control module 246 communicates a command to at least one controlling device connected to the corresponding gateway based on an event identified in event aggregation module 244, which is based on an event configuration. For example, an event comprises a temperature of a room reaching a predefined maximum temperature. The event-based control module 246 may communicate to the HVAC system to turn on the air conditioning system for the room if such an event occurs.

The client-based control module 248 communicates a command to one or more controlling devices of the corresponding gateway based on a command initiated and communicated from the client device. For example, a user at the client device may initiate a command to pan a camera connected to the gateway. Such command would be communicated to the camera via the client-based control module 248.

Figure 2D:
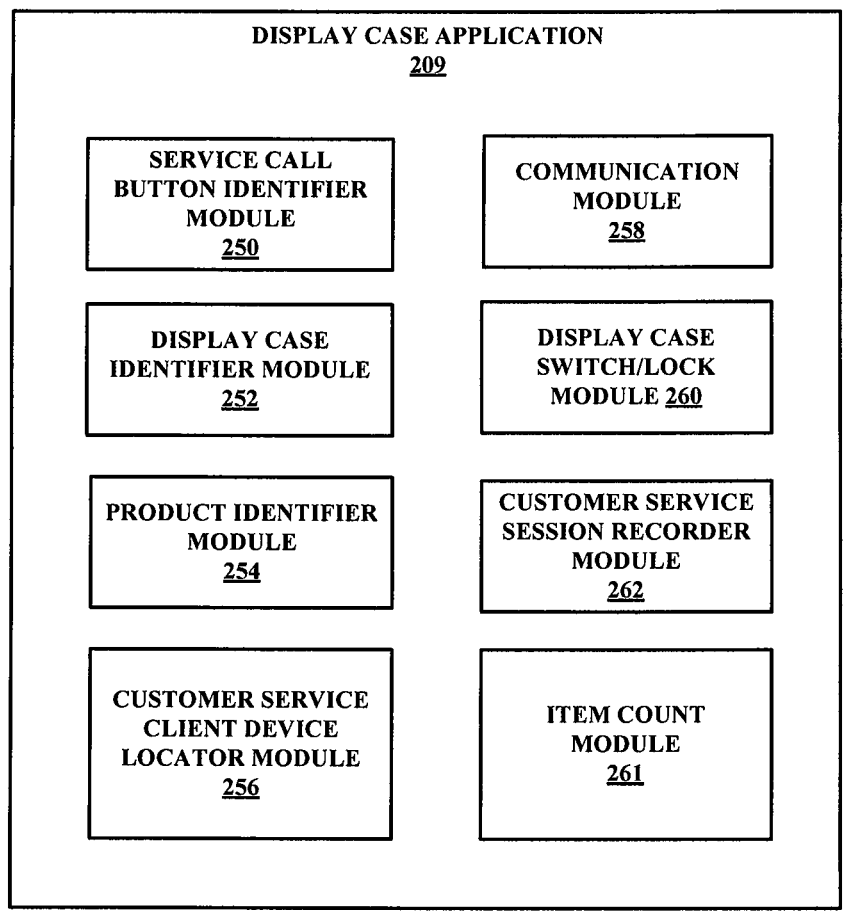
FIG. 2D is a block diagram illustrating an example embodiment of a display case application.

FIG. 2D is a block diagram illustrating an example embodiment of the display case application 209. In one embodiment, the display case application includes a service call button identifier module 250, a display case identifier module 252, a product identifier module 254, a customer service client device locator module 256, a communication module 258, a display case switch/lock module 260, a customer service session recorder module 262, and an item count module 261.

The service call button identifier module 250 identifies a service call button in the retail store 136. For example, service call buttons may be located throughout the retail store 136.

The display case identifier module 252 identifies a display case associated with the service call button in the retail store 136. In one embodiment, there is a service call button for each display case in the retail store 136.

The product identifier module 254 identifies a product associated with the display case identified by display case identifier module 252.

The customer service client device locator module 256 identifies a remote client device that is associated with the product inside the display case. The identified client device may be located inside or outside the retail store 136.

The communication module 258 enables an audio and/or video communication session between a communication device at the display case and the identified remote client device.

The display case switch/lock module 260 controls a lock of the display case in response to the remote client device to allow a customer to access the product inside the display case.

The customer service session recorder module 262 records a communication session between the customer and the customer representative at the client device. The communication session may include a video session, an audio session or both. In one embodiment, the video/audio record may be used for feedback and for customer service training.

Figure 2E:
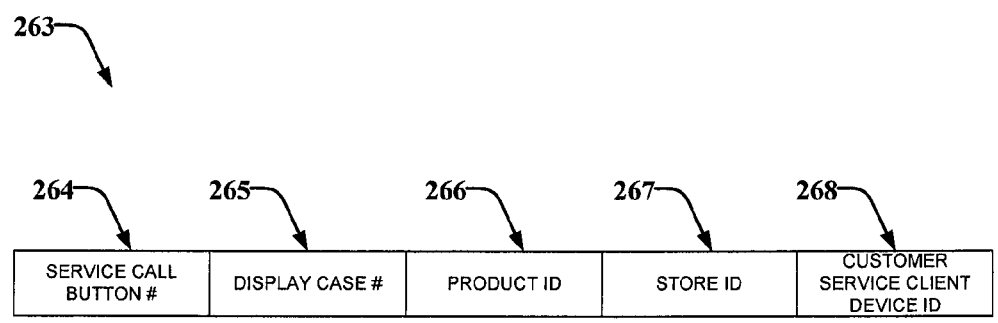
FIG. 2E is a block diagram illustrating a table for a display case application.

The storage device 212 of gateway 200 may store the audio/video communication session, a directory of service call button identifiers, display case identifiers, product identifiers, store identifiers, and corresponding remote client devices. FIG. 2E illustrates an example of a table 263 stored in the storage device 212. The table 263 includes a service call button identifier 264, a display case identifier 265, a product identifier 266, a store identifier 267, and a customer service client device identifier 268.

As such, the customer service client device locator module 256 communicates with a web server to identify the corresponding remote client device based on the product inside the display case. The gateway connects with the communication device at the display case with the corresponding customer service client device. For example, a remote client device may be capable of supporting and handling all calls related to video games from stores located on the East coast or in a predetermined geographic area.

The item count module 261 is configured to determine the number of products/items present in the display case 138. In one embodiment, the number of products in the display case 138 may be determined by determining the total weight of the items in the display case 138 using a scale. The scale may be place inside or outside the display case 138. Other methods to determine the number of items in the products may be used (e.g., RFID, camera surveillance, etc. . . . ). The item count module 261 allows the customer representative at the client device to verify that the customer is grabbing the correct number of items from the display case.

Figure 3:
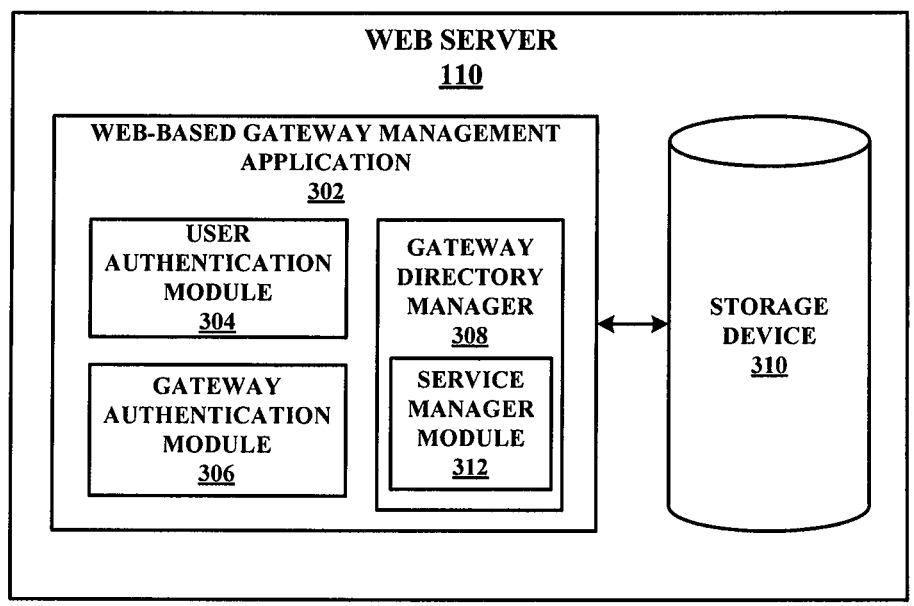
FIG. 3 is a block diagram illustrating an example embodiment of a web server.

FIG. 3 is a block diagram illustrating an example embodiment of a web server 110 (also referred to as a web-based host). The web server 110 comprises a web-based gateway management application 302 and a storage device 310. The web-based gateway management application 302 identifies a gateway associated with a user at the client device, authenticates with the user at the client device, and authenticates with the identified gateway.

In one embodiment, the web-based gateway management application 302 includes a gateway directory manager 308, a user authentication module 304, and a gateway authentication module 306. The gateway directory manager 308 identifies a gateway associated with a user profile. For example, a user may only be able to access a particular gateway or a particular set of devices connected to a gateway. As such, a west coast manager of an organization may be able to access monitored sites only from west coast stores of the organization. In contrast, a user with higher privileges may be able to access more gateways and devices. As such, the CEO of an organization with stores throughout the U.S. may be able to view monitoring data from all the stores in the U.S.

In another embodiment, the gateway directory manager 308 includes a service manager module 312 to enable add-on services to the user at the client device. For example, the add-on services include, but are not limited to, remote storage, remote audio, two-way audio, dynamic backup, or reporting, based on the user profile.

The user authentication module 304 authenticates the web server 110 with the user at the client device based on the user profile. For example, the web server 110 verifies the username and password of the user at the client device.

The gateway authentication module 306 authenticates the identified gateway. For example, the web server 110 receives a unique token from the identified gateway to authenticate the identified gateway prior to establishing secured communication between the web server and the gateway.

The storage device 310 may be used to store user profiles, tokens from gateways, a directory of gateways with corresponding devices, services from the gateways, a directory of gateways associated with a user profile, and a directory of connected security devices associated with a user profile.

Figure 4:
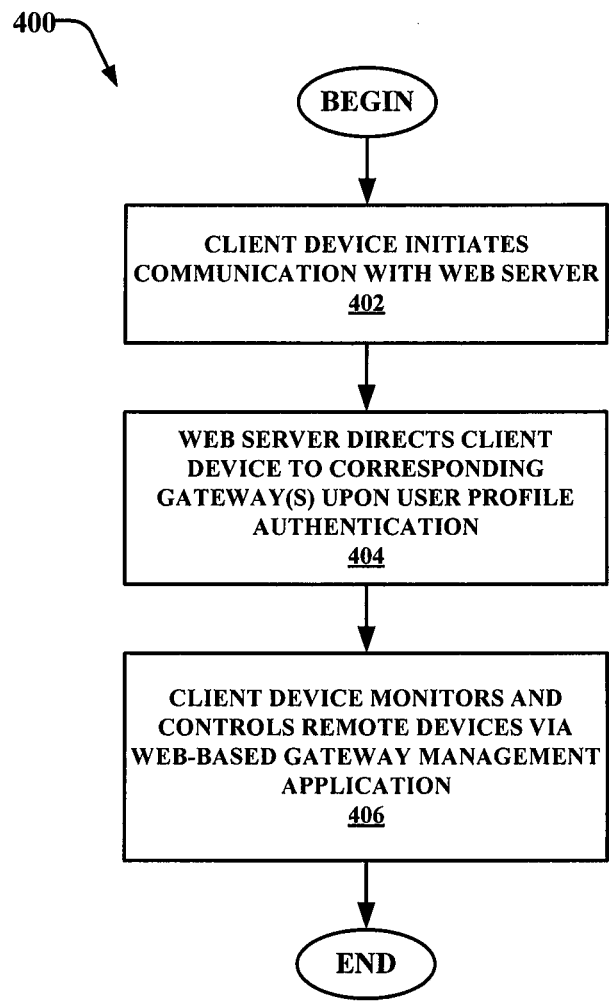
FIG. 4 is a flow chart of one embodiment of an example method for monitoring and controlling devices attached to a gateway.

FIG. 4 is a flow chart 400 of one embodiment of an example method for monitoring and controlling devices attached to a gateway. At 402, a user at a client device initiates communication with a web server to access monitoring data from the devices connected to a gateway. At 404, the web server directs the client device to the corresponding gateway based on the user profile of the user at the client device. At 406, the client device is able to monitor and control, from a central interface, monitoring and controlling devices connected to the identified gateway(s). In one embodiment, the client device receives an aggregated view of all security devices from several correlated gateways by communicating with only one gateway.

Figure 5:
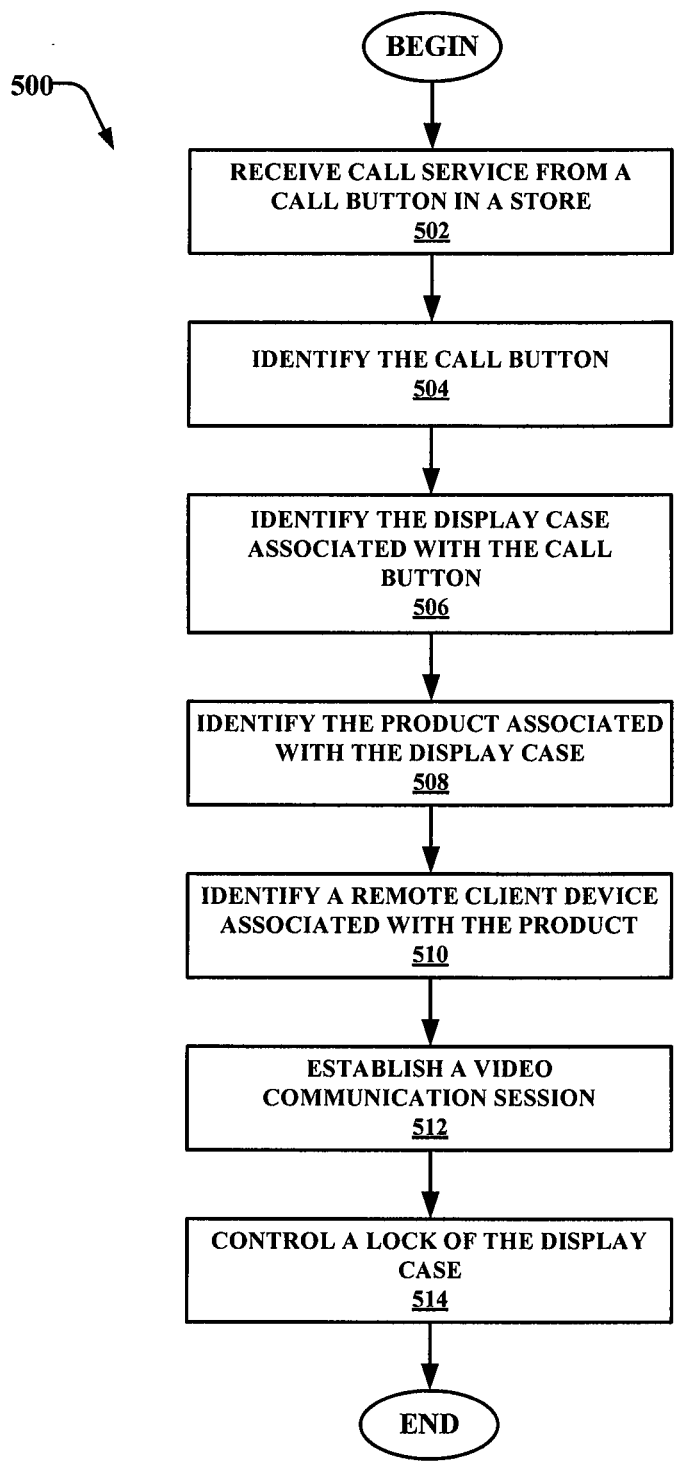
FIG. 5 is a flow chart of one embodiment of an example method for operating a high value display case system.

FIG. 5 is a flow chart 500 of one embodiment of an example method for operating a high value display case system. At 502, a call service is received from a service call button in a store. At 504, the service call button in the store is identified. At 506, the display case associated with the service call button in the store is identified. At 508, the product associated with the display case is identified. At 510, the remote client device inside or outside the store is identified. The remote client device is associated with the product inside the display case in the store. At 512, a communication session (audio and/or video) between a communication device at the display case and the remote client device is established. At 514, the lock of the display case is controlled in response to the remote client device to allow access to the product inside the display case.

In one embodiment, the communication session is recorded and stored in a storage device. Furthermore, the storage device can store a directory of service call button identifiers, display case identifiers, product identifiers, store identifiers, and corresponding remote client devices.

In another embodiment, the gateway communicates with a web server to identify the corresponding remote client device based on the product inside the display case.

Figure 6:
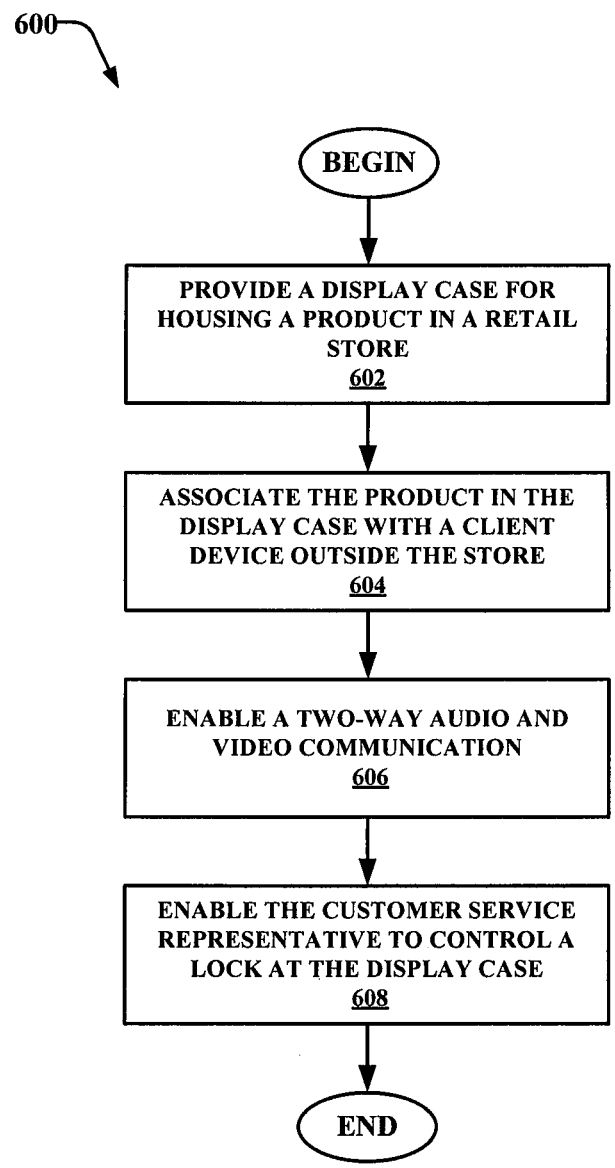
FIG. 6 is a flow chart of one embodiment of an example method for providing a high value display case system.

FIG. 6 is a flow chart 600 of one embodiment of an example method for providing a high value display case system. At 602, a display case is provided for housing a product in a retail store. At 604, the product in the display case is associated with a client device that is located inside or outside the store. At 606, a two-way audio and/or video communication between a customer at the display case and a customer service representative is enabled at the client device. The customer service representative is associated with the product. For example, the customer service representative may be an expert knowledgeable about the features of the product inside the display case. At 608, the customer service representative at the client device can control a lock at the display case to allow the customer access to the product in the display case based on the two-way audio and/or video communication.

In another embodiment, the customer service representative at the client device can communicate a promotion for the product to the customer via the two-way audio and video communication.

Figure 7:
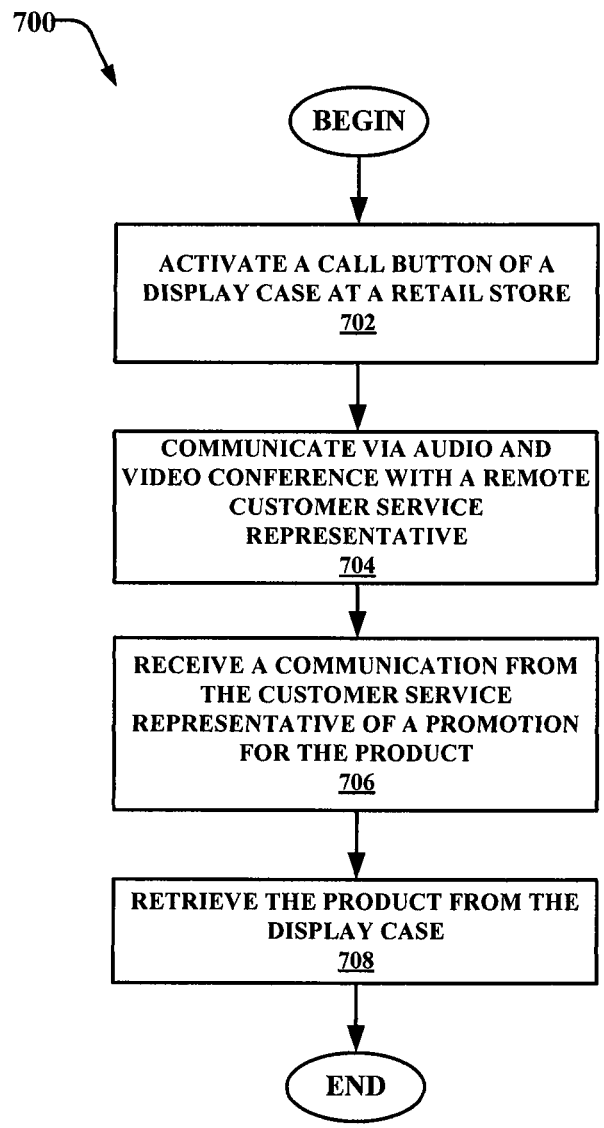
FIG. 7 is a flow chart of one embodiment of an example method for making use of a high value display case system.

FIG. 7 is a flow chart 700 of one embodiment of an example method for making use of a high value display case system. At 702, a service call button of a display case at a retail store is activated. At 704, a customer communicates via audio and/or video conference with a remote customer service representative associated with a product housed in the display case in response to the service call button being activated. At 706, the customer receives a communication from the remote customer service representative of a promotion for the product. At 708, the customer retrieves the product from the display case in response to the remote customer service representative remotely unlocking the display case.

Figure 8:
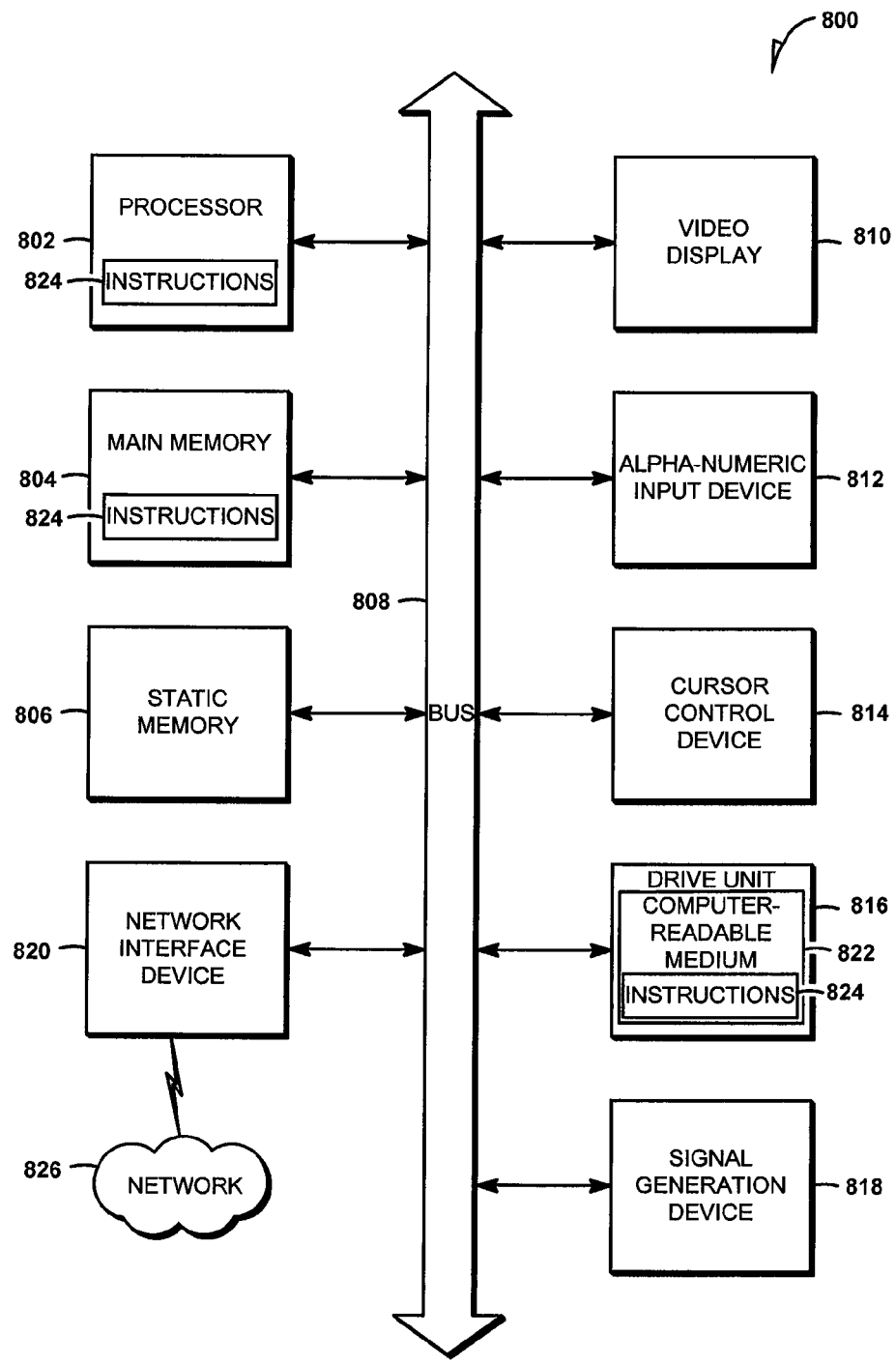
FIG. 8 shows a diagrammatic representation of machine in the example form of a computer system within which a set of instructions may be executed to cause the machine to perform any one or more of the methodologies discussed herein.

FIG. 8 shows a diagrammatic representation of a machine in the example form of a computer system 800 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, with the main memory 804 and the processor 802 also constituting machine-readable media.

The software 824 may further be transmitted or received over a network 826 via the network interface device 820 utilizing any one of a number of well-known transfer protocols (e.g., HTTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

Figure 9:
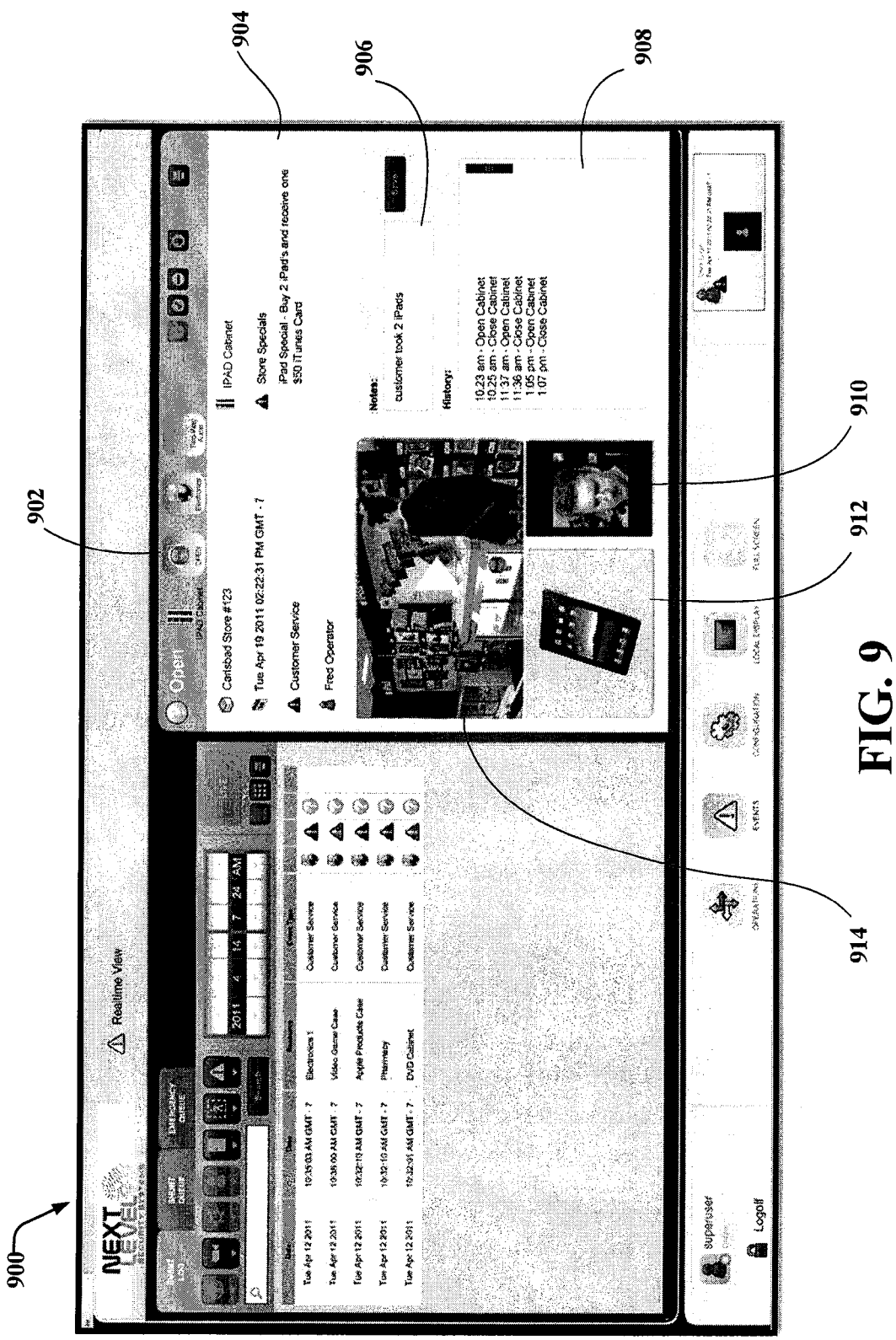
FIG. 9 is a screenshot of an example of a graphical user interface at the client device.

FIG. 9 is a screenshot 900 of an example of a graphical user interface at the client device. The screenshot 900 includes a live video feed 914 from the communication device, a picture 912 of one or more products in the display case, a picture of the face of the customer (grabbed from a frame of the video feed), information 904 on promotions related to the product in the display case, notes 906 for the customer service representative to fill out, a history 908 of when the display case was locked and unlocked, and a virtual button 902 to unlock or open the display case.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A display case system comprising:
    a display case configured to house a plurality of products;
    a gateway coupled to the display case, the gateway configured to communicate with a client device associated with the product in the display case; and
    a communication device coupled to the gateway, the communication device configured to enable a communication session between the communication device and the client device associated with the plurality of products, the client device configured to remotely lock and unlock the display case to allow access to all products in the display case prior to a purchase of at least one of the products, the access based on the communication session, the client device configured to generate a graphical user interface comprising a video clip of a user approaching the display case, an image of the product, an image of a face of the user, and a history log of times when the display case has been opened and closed.

2. The display case system of claim 1 further comprising:
    a service call button coupled to the communication device, the service call button configured to call the client device associated with the plurality of products in the display case; and
    a switch coupled to the display case, the switch configured to lock and unlock the display case in response to the client device,
    wherein the display case, the communication device, the service call button, and the switch are located in a retail store, the client device is located outside the retail store, and the communication session includes a video call conference.

3. The display case system of claim 1 further comprising:
    a web server configured to identify the client device associated with the gateway and the plurality of products in the display case.

4. The display case system of claim 2 wherein the communication device comprises a video camera, a microphone, and a speaker.

5. A gateway comprising:
    a service call button identifier module configured to identify a service call button in a store;
    a display case identifier module configured to identify a display case associated with the service call button in the store;
    a product identifier module configured to identify a product plurality of products associated with the display case;
    a customer service client device locator module configured to identify a remote client device outside the store, the remote client device associated with the plurality of products inside the display case in the store, the remote client device configured to generate a graphical user interface comprising a video clip of a user approaching the display case, an image of one of the plurality of products, an image of a face of the user, and a history log of times when the display case has been opened and closed;
    a communication module configured to enable a video communication session between a communication device at the display case and the remote client device; and
    a display case switch module configured to control a lock of the display case in response to the remote client device to allow access to the plurality of products.

6. The gateway of claim 5 further comprising:
    a customer service session recorder module configured to record the video communication session; and
    a storage device configured to store the video communication session, the storage device comprising a directory of service call button identifiers, display case identifiers, product identifiers, store identifiers, and corresponding remote client devices.

7. The gateway of claim 5 wherein the customer service client device locator module is configured to communicate with a web server to identify the corresponding remote client device based on the plurality of products.

8. The gateway of claim 5 further comprising:
    an application programming interface (API) to interface the gateway with the remote client device;
    an application module to monitor or control a security device coupled to the gateway;

a device driver to enable interaction of the application module with the corresponding security device;

a web server communication module configured to enable communication with a web server, the client device, and other gateways, to receive additional APIs, respective application modules, and respective device drivers, and to copy a configuration of the gateway to other gateways;

a remote device management module configured to aggregate monitoring data from the security device and from other security devices respectively coupled to other gateways correlated with the gateway by the web server, and to enable the client device to monitor or control the security device coupled to the respective gateway, wherein the application module comprises the service call button identifier module, the display case identifier module, the product identifier module, the customer service client device locator module, the communication module, and the display case switch module.

9. A computer-implemented method comprising:
receiving a call service from a service call button in a store;
identifying the service call button in the store;
identifying a display case associated with the service call button in the store;
identifying a plurality of products associated with the display case;
identifying a remote client device outside the store, the remote client device associated with the plurality of products inside the display case in the store, the remote client device configured to generate a graphical user interface comprising a video clip of a user approaching the display case, an image of the plurality of products, an image of a face of the user, and a history log of times when the display case has opened and closed;
establishing a video communication session between a communication device at the display case and the remote client device; and
controlling a lock of the display case in response to the remote client device to allow access to all products in the display case prior to a purchase of at least one of the products.

10. The computer-implemented method of claim 9 further comprising:
recording the video communication session; and
storing the video communication session in a storage device, the storage device comprising a directory of service call button identifiers, display case identifiers, product identifiers, store identifiers, and corresponding remote client devices.

11. The computer-implemented method of claim 9 further comprising:
communicating with a web server to identify the corresponding remote client device based on the plurality of products.

12. A non-transitory computer-readable storage medium storing a set of instructions that, when executed by a processor, cause the processor to perform operations, comprising:
receiving a call service from a service call button in a store;
identifying the service call button in the store;
identifying a display case associated with the service call button in the store;
identifying a plurality of products associated with the display case;
identifying a remote client device outside the store, the remote client device associated with the plurality of products inside the display case in the store, the remote client device configured to generate a graphical user interface comprising a video clip of a user approaching the display case, an image of the plurality of products, an image of a face of the user, and a history log of times when the display case has opened and closed;
establishing a video communication session between a communication device at the display case and the remote client device; and
controlling a lock of the display case in response to the remote client device to allow access to all products in the display case prior to a purchase of at least one of the products.

13. The non-transitory computer-readable storage medium of claim 12 further comprising:
recording the video communication session; and
storing the video communication session in a storage device, the storage device comprising a directory of service call button identifiers, display case identifiers, product identifiers, store identifiers, and corresponding remote client devices.

14. The non-transitory computer-readable storage medium of claim 12 further comprising:
communicating with a web server to identify the corresponding remote client device based on the plurality of products.

15. A method comprising:
providing a display case for housing a plurality of products in a retail store;
associating the plurality of products in the display case with a client device, the client device located outside the store, the client device configured to generate a graphical user interface comprising a video clip of a user approaching the display case, an image of the plurality of products, an image of a face of the user, and a history log of times when the display case has been opened and closed;
enabling a two-way audio and video communication between a customer at the display case and a customer service representative at the client device, the customer service representative associated with the plurality of products; and
enabling the customer service representative at the client device to control a lock at the display case to allow the customer access to all products in the display case prior to a purchase of at least one of the products, the access based on the two-way audio and video communication.

16. The method of claim 15 further comprising:
communicating a promotion for the plurality of products to the customer from the remote customer service representative via the two-way audio and video communication.

17. A method comprising:
activating a service call button of a display case at a retail store;
communicating via audio and video conference with a remote customer service representative associated with a plurality of products housed in the display case in response to the service call button being activated, the remote customer service representative operating a client device configured to generate a graphical user interface comprising a video clip of a user approaching the display case, an image of the plurality of products, an image of a face of the user, and a history log of times when the display case has been opened and closed; and
accessing the plurality of products from the display case in response to the remote customer service representative unlocking the display case and prior to a purchase of at least one of the products in the display case.

18. The method of claim 17 further comprising:
receiving a communication from the remote customer service representative of a promotion for the plurality of products.

* * * * *